No. 756,077. PATENTED MAR. 29, 1904.
T. E. THOMPSON.
CULTIVATOR.
APPLICATION FILED APR. 29, 1903.
NO MODEL. 2 SHEETS—SHEET 1.
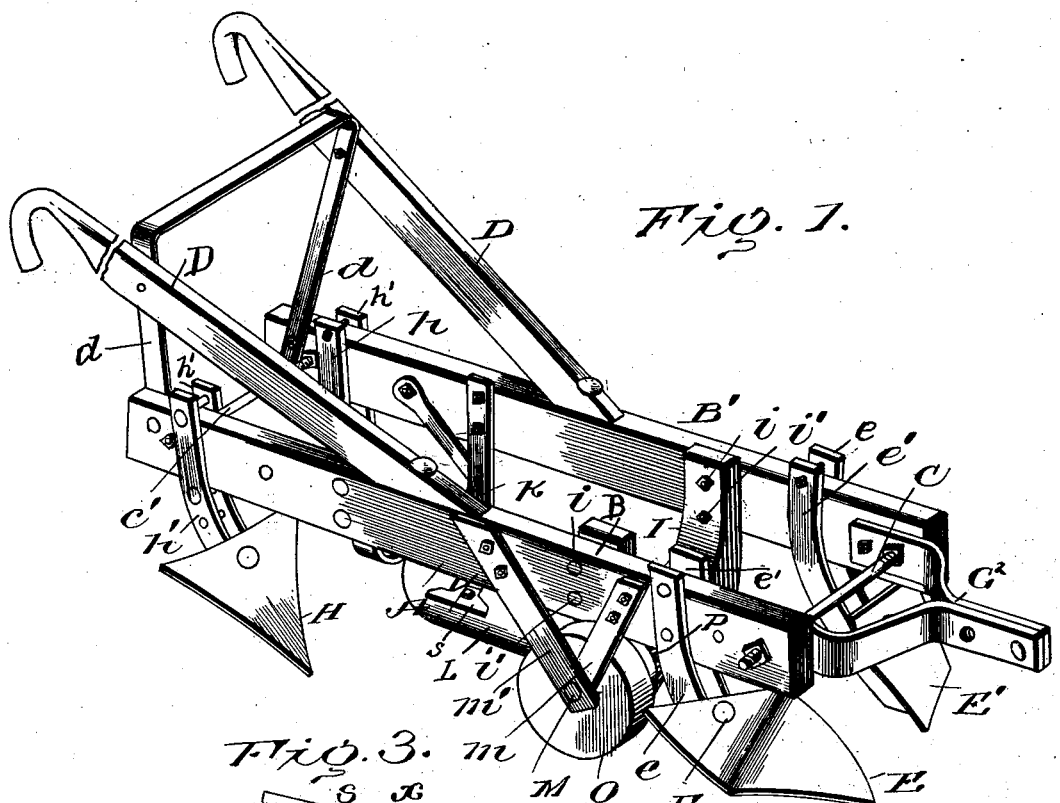
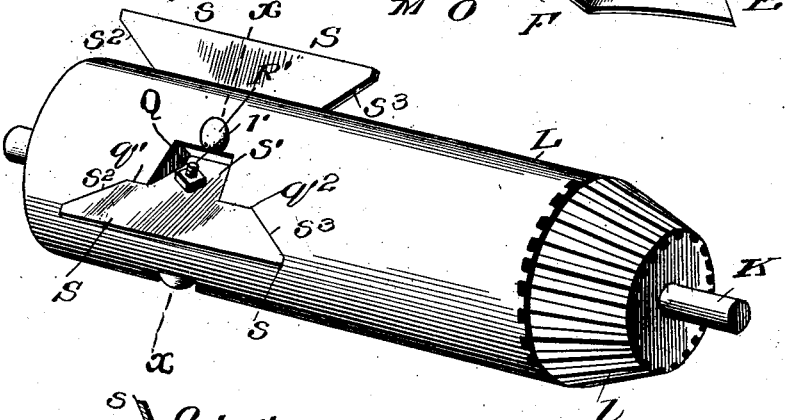
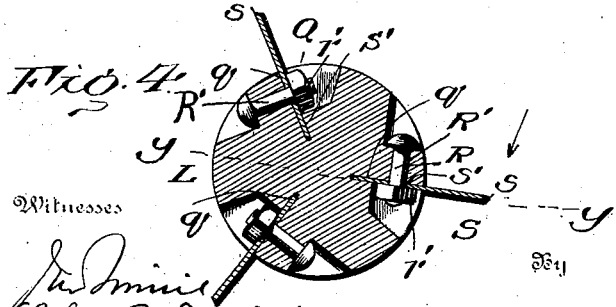

No. 756,077. PATENTED MAR. 29, 1904.
T. E. THOMPSON.
CULTIVATOR.
APPLICATION FILED APR. 29, 1903.
NO MODEL. 2 SHEETS—SHEET 2.
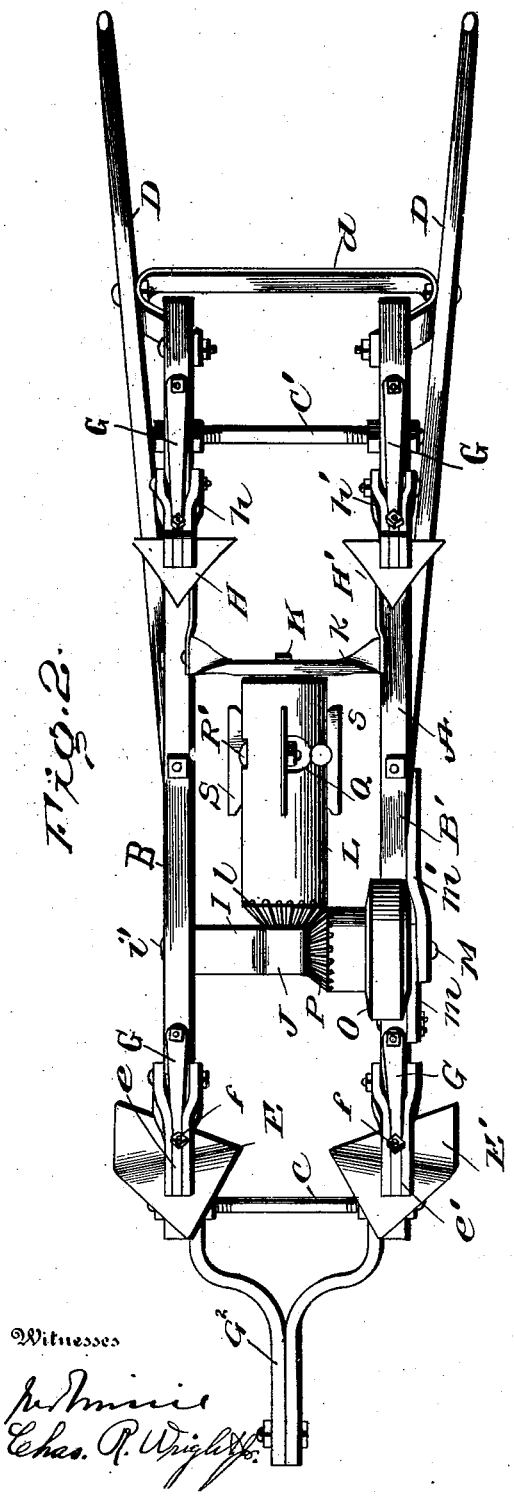
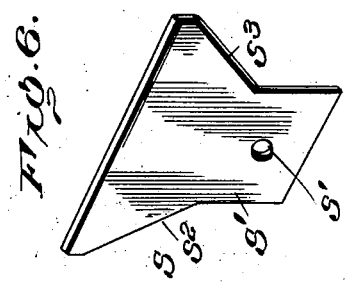
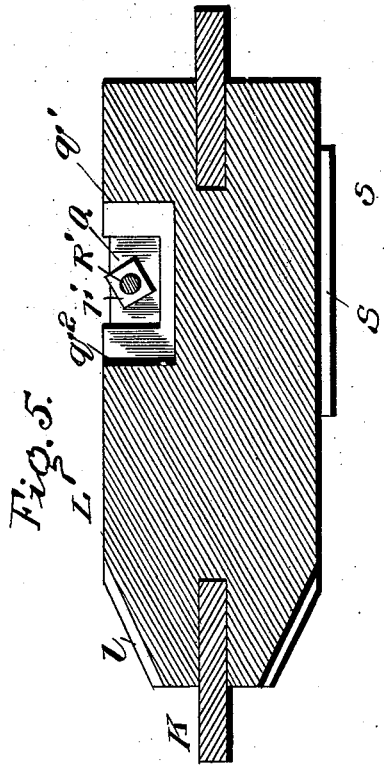
Witnesses
Inventor
Thomas E. Thompson
By A. S. Pattison
Attorney No. 756,077. Patented March 29, 1904.

UNITED STATES PATENT OFFICE.

THOMAS E. THOMPSON, OF ETHEL, MISSISSIPPI.

CULTIVATOR.

SPECIFICATION forming part of Letters Patent No. 756,077, dated March 29, 1904.

Application filed April 29, 1903. Serial No. 154,841. (No model.)

*To all whom it may concern:*

Be it known that I, THOMAS E. THOMPSON, a citizen of the United States, residing at Ethel, in the county of Attala and State of Mississippi, have invented new and useful Improvements in Cultivators, of which the following is a specification.

My invention relates to improvements in cultivators, and more particularly pertains to a combined straddle-row cultivator and chopper.

The object of my invention is to provide a cultivator of this character which is adapted to first scrape the dirt and weeds from each side of a row of cotton, then chopping or thinning the cotton, and afterward hilling or throwing the dirt up around the same, thus accomplishing all of the above-referred-to results by one operation.

Another object of my invention is to provide a simple, cheap, and durable cultivator of this character in which the scrapers, plows, and choppers can be readily removed or replaced when they become broken or worn.

In the accompanying drawings, Figure 1 is a perspective view of my improved cultivator. Fig. 2 is a bottom plan view of Fig. 1. Fig. 3 is an enlarged view of the rotary chopper, showing the means of securing the blades therein. Fig. 4 is a transverse sectional view taken on line $x$ $x$ of Fig. 3. Fig. 5 is a longitudinal sectional view of the drum. Fig. 6 is a perspective view of one of the blades removed.

Referring now to the drawings, A represents an elongated frame, which is composed of the two horizontal elongated beams B and B', which are connected at each end by a transverse bolt C and C', and the rear end of said frame A is provided with the rearwardly upwardly inclined handles D, and the said frame is provided with an upwardly-extending U-shaped brace $d$, which is adapted to rigidly hold the handles to the frame. The forward end of the frame is provided with an outwardly-extending clevis $G^2$, which is secured thereto by the transverse bolt C, connecting the forward end of the two horizontal parallel beams B and B'.

Each of the beams B and B' adjacent the forward end is provided with scrapers E and E', and said scrapers being carried by the beams it will be readily seen that they are spaced apart, and thus allow the same to straddle a row of corn or cotton or other grain. The said scrapers are secured to the downwardly-extending arms $e$ and $e'$, which are adapted to straddle the beams B or B' and to be bolted thereto, as clearly shown. The scraper proper (or blades E or E') has a bolt F extending therethrough, and said bolt passes between the arms $e$ and $e'$ and carries a nut $f$, and thus it will be readily seen that the said scrapers can be readily removed or replaced when one becomes worn or broken. Extending from the under side of the beams B and B' are braces G, which extend between the arms $e$ and $e'$ and are secured thereto.

The beams B and B' adjacent the rear ends are provided with plows H and H', which are mounted on downwardly-extending arms $h$ and $h'$, which are constructed and secured to the beams in precisely the same manner as the arms $e$ and $e'$, and said plows are detachable in the same manner, and these plows are adapted to throw the dirt or soil around the corn or cotton, as hereinafter more fully described.

The forward end of the beams B and B' in rear of the scraper-arms $e$ and $e'$ is provided with a downwardly-extending U-shaped yoke I, which is secured between the beams B and B' in any desired manner, while I have shown it secured by bolts $i$ and $i'$. The said yoke I extends downward and is provided with a downwardly-projecting lower vertical portion J. Mounted in said vertical portion J is a horizontal longitudinally-extending shaft K, which extends rearwardly and is rotatably mounted in a U-shaped yoke $k$, carried by the beams B and B' just in front of the arms $h$ and $h'$, carrying the plows H and H'. The said shaft K carries an enlarged drum L, which is provided at or formed in its forward end a beveled gear $l$, hereinafter more fully described. Mounted in the side of said vertical portion J is a transverse shaft M, which extends outwardly and has its opposite end mounted in downwardly-extending braces or arms $m$ and $m'$, carried by the longitudinal beam B. The said shaft M carries intermediate the arms $m$ and $m'$ and the vertical portion J of the yoke I a drive-wheel O, which is rigidly secured to the shaft M and is adapted to engage the ground and to be driven thereby. The inner side of said wheel O may be formed with or have secured thereto a beveled gear-wheel P, which is adapted to engage the beveled gear carried by the forward end of the drum L, and by means of which the said drum is driven, and it is also seen that the wheel O is at one side, and thus does not come in contact with the row of cotton being cultivated.

The drum L, as shown, is of a large diameter and is made of any desired material, although I preferably use wood for convenience and to lessen the weight of the cultivator. The said drum intermediate its ends is provided with a series of recesses Q, which are arranged, preferably, in a circumferential line, although they could, if desired, be arranged in any order on the drum, as this would form no part of my invention and should simply regulate the amount of thinning out of the grain my device would accomplish. The said recess Q is preferably of an elongated form and provided with a radially-extending wall $q$, which is of a length greater than the recess Q. This is accomplished by having each end of the recess Q provided with a slight recess $q'$ and $q^2$, and extending from the said vertical wall $q$ is a transverse opening R, which is adapted to receive a clamping-bolt R', as hereinafter more fully described. The chopping-blades S are preferably of a V-shaped form, with an outer cutting edge $s$ and the inner contracted portion S', said contracted portion being provided with an opening $s'$. The said contracted portion of the choppers S is adapted to fit within the recesses Q, and the oblique walls $s^2$ and $s^3$ of the choppers S are adapted to fit within the slight recess $q'$ and $q^2$, and thus the blades are held against any twisting or lateral movement. Passing through the transverse opening R and the opening $s'$ in the blade is a bolt R', which has an inner screw-threaded end $r$ within the recess Q, and on said screw-threaded portion is a nut $r'$, which firmly clamps the blades and holds them in the recess. It is understood that there is a recess for each blade and a separate bolt for each blade. Thus they can be readily removed independent of one another.

The scrapers and the plows being detachably connected to the arms, it will be seen that they can be reversed—that is, the plow could be placed in front of the chopper and the scrapers in rear thereof. Thus the plows would turn the soil up around the cotton, the choppers would thin the same, and the scrapers would smooth or scrape the soil around the cotton.

During the operation, as shown in Fig. 1, the ground or soil around the row of cotton is first scraped and the choppers rotating will thin or cut out a certain amount of the cotton, and this is regulated by the rotation of the drum. The faster the drum rotates the less space will be left between the places where the choppers strike the ground, and if the drum should be so geared as to rotate very rapidly the entire row of cotton would be cut; but it is so regulated that it will leave a hill of grain at the proper distance now most commonly used.

Having thus described my invention, what I claim as new, and desire to secure by Letters Patent, is—

1. A cultivator, comprising a frame, a drum mounted in said frame, and having radially-extending recesses therein, elongated blades having reduced inner ends resting in said recesses and transversely-arranged bolts passing through the reduced portion of the blades, and nuts on said bolts within said radial recesses.

2. A cultivator, comprising a frame, a drum mounted in said frame, and having elongated radially-extending recesses therein and enlarged recesses communicating therewith, elongated blades resting in said radial recesses, transversely-arranged bolts passing through the drum and the blades and terminating in said enlarged recess, and nuts on said bolts within said enlarged recess.

3. A cultivator, comprising a frame, a drum mounted in said frame, and having recesses therein and each recess provided with a radial wall, blades within said recesses and resting against said radial walls and bolts passing transversely through said drum and blades.

4. A cultivator, comprising a frame, a drum mounted therein and having enlarged recesses therein, and each recess having a radial wall, the said drum having small recesses adjacent the large recesses and having a wall parallel the radial wall thereof and bolts passing through the parallel walls of the small and large recess and the said blades.

5. A cultivator comprising an elongated frame, a longitudinally-extending drum carried thereby and having elongated recesses therein, and each recess having a radial wall, and adjacent each end of said wall is a longitudinally-extending small recess, blades resting against said vertical wall and having their ends resting in said small recess, and bolts holding said blades in the recess against the radial wall.

6. A cultivator comprising a frame, a drum mounted therein and having blade-receiving recesses therein and each recess having a radial wall, a small recess adjacent each blade-receiving recess, and having a wall parallel the radial wall thereof, bolts passing through the parallel wall of the small and blade-receiving openings and through the blades and nuts on said bolts within the blade-receiving openings.

In testimony whereof I have hereunto set my hand in the presence of two subscribing witnesses.

THOS. E. THOMPSON.

Witnesses:
J. H. SULLIVANT,
W. P. RATLIFF.